United States Patent
Kang

(10) Patent No.: US 7,110,529 B2
(45) Date of Patent: Sep. 19, 2006

(54) BOOKMARKING METHOD AND APPARATUS FOR AN ELECTRONIC PHONE BOOK

(75) Inventor: Sun-Kyoung Kang, Kunpo-shi (KR)

(73) Assignee: Samsung Electronics Co., Ltd., (KR)

( * ) Notice: Subject to any disclaimer, the term of this patent is extended or adjusted under 35 U.S.C. 154(b) by 384 days.

(21) Appl. No.: 10/115,606

(22) Filed: Apr. 3, 2002

(65) Prior Publication Data

US 2002/0159583 A1    Oct. 31, 2002

(30) Foreign Application Priority Data

Apr. 26, 2001    (KR)    ............................... 2001-22563

(51) Int. Cl.
*H04M 1/00*    (2006.01)
*H04M 3/00*    (2006.01)

(52) U.S. Cl. ............ 379/355.02; 379/372; 379/373.01; 379/373.03

(58) Field of Classification Search ........... 379/355.02, 379/355.03, 355.09, 356.01, 357.05, 373.01, 379/373.03, 377, 372
See application file for complete search history.

(56) References Cited

U.S. PATENT DOCUMENTS

| | | | | |
|---|---|---|---|---|
| 5,568,546 A | * | 10/1996 | Marutiak | ................ 379/355.05 |
| 6,005,927 A | * | 12/1999 | Rahrer et al. | ........... 379/142.01 |
| 6,097,964 A | * | 8/2000 | Nuovo et al. | ................ 455/566 |
| 6,185,295 B1 | * | 2/2001 | Frederiksen et al. | ... 379/355.05 |
| 6,330,310 B1 | * | 12/2001 | Kurosawa | .................... 379/111 |
| 6,411,822 B1 | * | 6/2002 | Kraft | ........................... 455/558 |
| 6,554,192 B1 | * | 4/2003 | Tingl | ........................... 235/487 |
| 6,606,381 B1 | * | 8/2003 | Wunsch | ................. 379/356.01 |
| 6,624,809 B1 | * | 9/2003 | Kowaguchi | ................. 345/169 |
| 6,766,017 B1 | * | 7/2004 | Yang | ..................... 379/355.02 |
| 6,804,338 B1 | * | 10/2004 | Chen | ..................... 379/142.08 |
| 2001/0018353 A1 | * | 8/2001 | Ishigaki | ...................... 455/566 |
| 2002/0119767 A1 | * | 8/2002 | Fieldhouse et al. | ......... 455/406 |

FOREIGN PATENT DOCUMENTS

| | | |
|---|---|---|
| JP | 11-252235 | 9/1999 |
| JP | 2001061001 | 3/2001 |
| WO | WO 96/07286 | 3/1996 |
| WO | WO 00/33548 | 6/2000 |

* cited by examiner

*Primary Examiner*—Matthew Anderson
*Assistant Examiner*—Tuan Pham
(74) *Attorney, Agent, or Firm*—Dilworth & Barrese, LLP

(57) ABSTRACT

A method and an apparatus for using an electronic phone book in a communication terminal are provided. If a user manually requests a phone number to be registered as a bookmark, or the number of calls to the phone number exceeds a predetermined first threshold, the phone number is saved in a bookmark DB. Upon user request for a bookmark mode operation, bookmarked phone numbers are presented. If the number of calls to a phone number stored in the bookmark DB for a predetermined time period does not exceed a predetermined second threshold, the phone number is deleted from the bookmark DB. Therefore, the user can give a call without memorizing frequently used phone numbers or direct dialing.

9 Claims, 6 Drawing Sheets

BOOKMARKING METHOD AND APPARATUS FOR AN ELECTRONIC PHONE BOOK

PRIORITY

This application claims priority to an application entitled "Bookmarking Method and Apparatus for Electronic Phone Book" filed in the Korean Industrial Property Office on Apr. 26, 2001 and assigned Ser. No. 2001-22563, the contents of which are hereby incorporated by reference.

BACKGROUND OF THE INVENTION

1. Field of the Invention

The present invention relates generally to a portable terminal, and in particular, to a method and apparatus for using an electronic phone book of a portable terminal.

2. Description of the Related Art

As communication technology develops, most individual users own at least one wireless or wired phone number. Therefore, various techniques have been explored to manage phone numbers for the individual users. One of the techniques is an electronic phone book for a portable terminal such as a personal computer (PC), a wired telephone, a cellular phone, or a PDA (Personal Digital Assistant). Such a portable terminal saves a plurality of names, addresses, and phone numbers entered by a user in association with each other, so that the user can select menu items using a display means, search the electronic phone book for an intended phone number, and automatically dials the selected phone number. Due to the advantages of being portable and convenient dialing features, the electronic phone book takes the place of existing phone books.

While the increasing memory capacity of the portable terminal increases the number of entries in the electronic phone book, only a limited number of phone numbers are frequently used in reality. However, conventional electronic phone book technology requires a user to search the entire electronic phone book by selecting many menu items in order to detect an intended phone number.

FIG. 1 illustrates an example of a typical electronic phone book search operation. As shown in FIG. 1, to search for an intended phone number, a user must go through a number of menu items (menu key→1. phone book→3. search by name→2. Tom . . . ). Accordingly, there is a need for a method of more readily searching for a plurality of phone numbers in an electronic phone book.

SUMMARY OF THE INVENTION

It is, therefore, an object of the present invention to provide a method and apparatus for more readily searching an electronic phone book.

It is another object of the present invention to provide a method and apparatus for searching an electronic phone book using a bookmark function.

The foregoing and other objects of the present invention are achieved by providing a bookmarking method and a terminal using the bookmarking method.

According to one object of the present invention in a bookmarking method in a terminal having a phone number database (DB) for storing an electronic phone book and a bookmark DB, the number of calls to each phone number given by a user is counted. If the number of calls to a phone number exceeds a predetermined first threshold, the phone number is stored in the bookmark DB. If the number of calls to a bookmarked phone number for a predetermined time period does not exceed a predetermined second threshold, the phone number is deleted from the bookmark DB.

According to another object of the present invention, in a bookmarking method in a terminal having a phone number DB for storing an electronic phone book and a bookmark DB, upon user request for a bookmark mode operation, bookmarked phone numbers stored in the bookmark DB are displayed. If a phone number is selected among the displayed bookmarked phone numbers, the phone number is automatically dialed.

According to a further object of the present invention, in a terminal using an electronic phone book, a phone number DB stores at least one phone number entered by a user and a bookmark DB stores at least one manually user-registered phone number and/or at least one automatically registered phone number. A controller searches the phone number DB for the at least one phone number or searches the bookmark DB for the at least one bookmarked phone number in response to a user request.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The present invention is applicable to a terminal supporting the function of searching an electronic phone book having at least one phone number for an intended phone number by selecting menu items.

Figure 1:
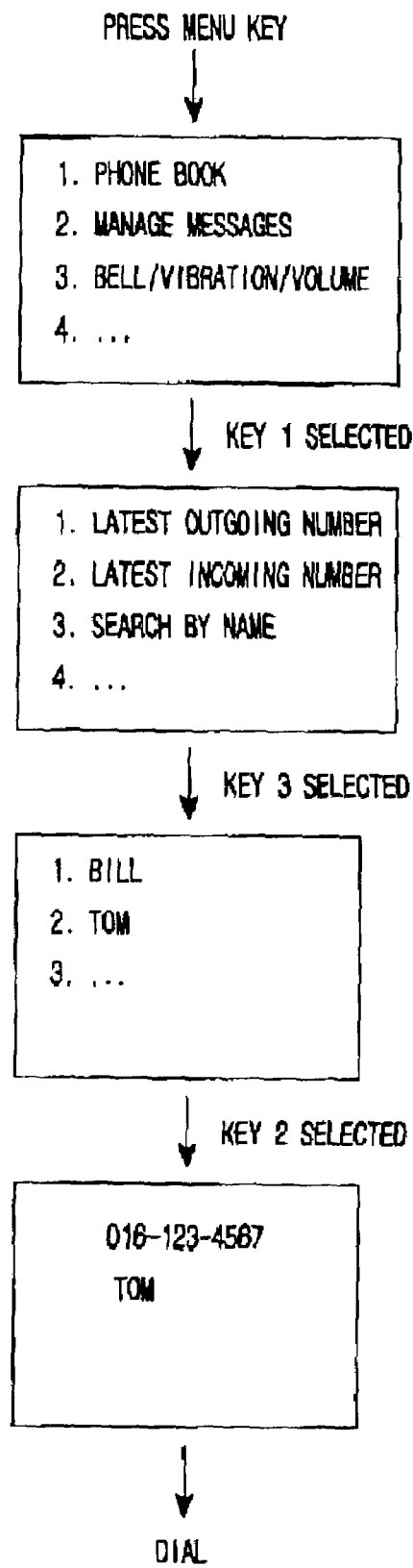
FIG. 1 illustrates an example of a typical electronic phone book search operation.
Figure 2:
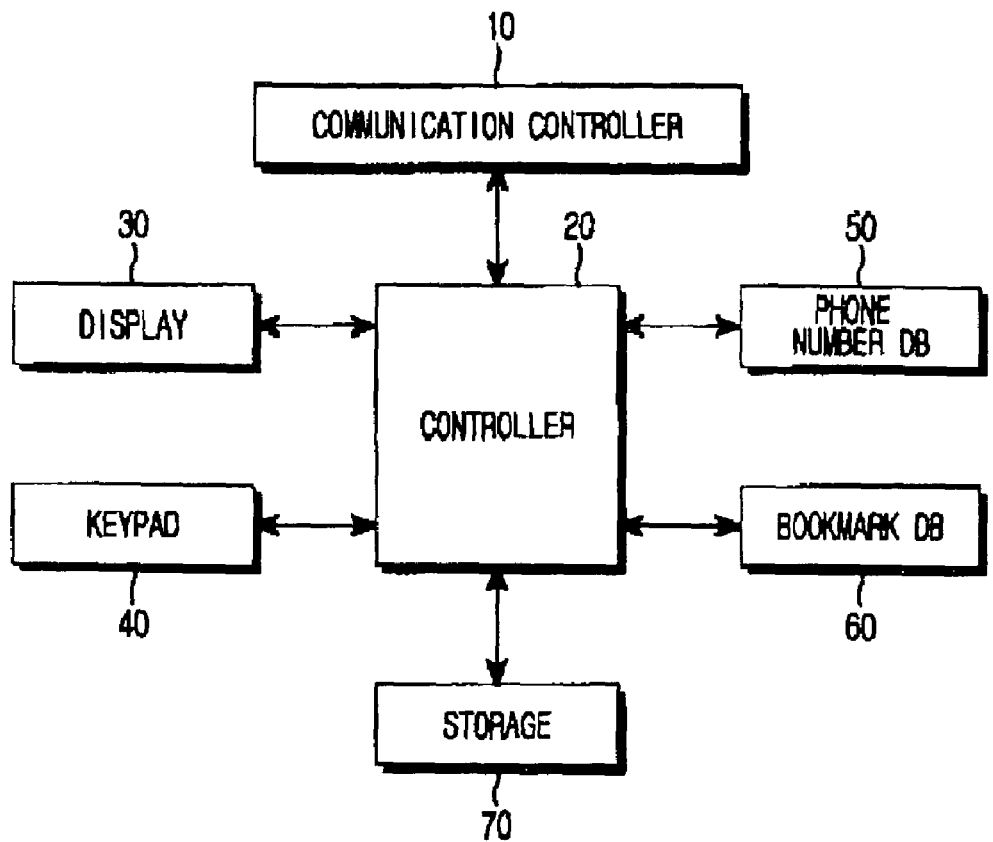
FIG. 2 is a schematic block diagram of a communication terminal according to the present invention.

FIG. 2 is a schematic block diagram of a communication terminal according to the present invention. Referring to FIG. 2, the terminal includes a communication controller 10 for exchanging voice or data with another terminal through an exchange system. In the case of a cellular phone, the communication controller 10 has an RF module connected to an antenna, which includes a transmission/reception amplifier and a modulator/demodulator, a speaker/microphone enabling voice calls, and a digital signal processor (DSP). The communication controller 10 dials a user-selected phone number under control of a controller 20.

A display 30 may comprise an LCD (Liquid Crystal Display) for displaying characters, graphics, images, etc. The display 30 displays various kinds of display data generated in the terminal, and especially an electronic phone book, in response to a user request. A keypad 40 is provided with a plurality of digit/character keys, function keys, and communication keys for user interfacing.

The controller 20 includes a microprocessor for controlling the terminal and other circuits and enables the terminal user to communicate with another terminal user by controlling the communication controller 10. Specifically, the controller 20 executes an operation program for searching an electronic phone book according to the embodiment of the present invention.

A storage component 70 is comprised of a ROM (Read Only Memory) for storing a plurality of program codes, a RAM (Random Access Memory) for storing processed data, and a voice memory. Also, the storage component 70 stores bookmark search program codes according to the present invention. A phone number DB 50 serves as an electronic phone book by storing at least one phone number manually entered by the user and/or related information (e.g., name and address) in association with each other. A bookmark DB 60 stores at least one user-selected phone number. Frequently used phone numbers and related information are stored in association with each other in the bookmark DB 60. They can be registered manually by the user or automatically. The phone number DB 50 and the bookmark DB 60 are preferably stored in different memories, or may be stored in different areas of the same memory.

It is to be appreciated in the following description of bookmarking in the electronic phone book according to the present invention that the bookmarking is done as the controller 20 executes a bookmark search program stored in the storage component 70.

Figure 3:
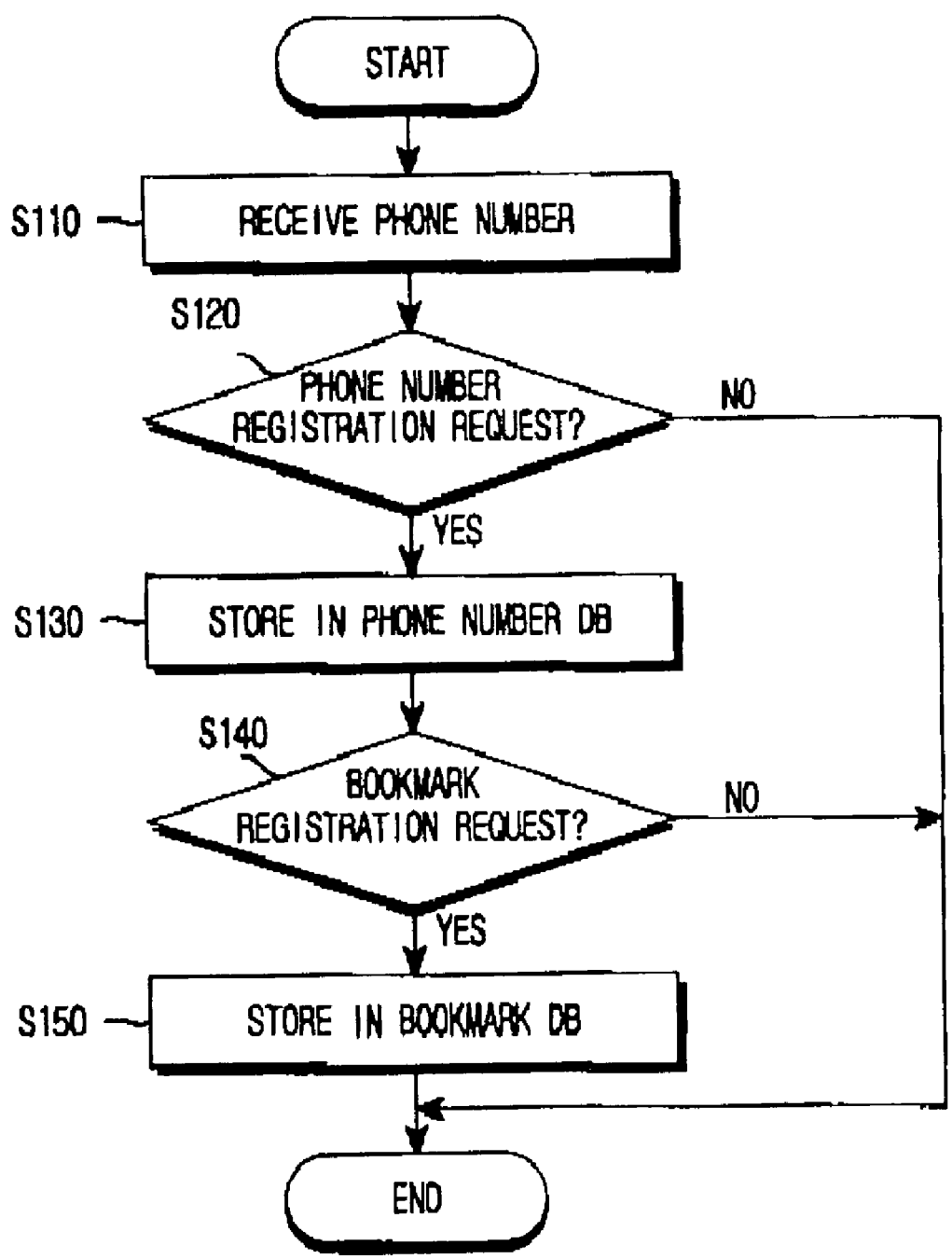
FIG. 3 is a flowchart illustrating an operation of registering a phone number as a bookmark according to an embodiment of the present invention.

FIG. 3 is a flowchart illustrating an operation of registering a phone number as a bookmark according to an embodiment of the present invention. Referring to FIG. 3, when a user enters a phone number (and related information) through the keypad 40 in step S110, the keypad 40 converts the key input to an electrical signal and feeds the electrical signal to the controller 20. Upon a user request for registration of the entered phone number (and related information) in step S120, the controller 20 stores the received phone number (and related information) in the phone number DB 50 and provides a menu by which the phone number can be registered as a bookmark on the display 30 in step S130. Upon a user request for registration of the entered phone number (and related information) as a bookmark in step S140, the controller 20 stores the entered phone number (and related information) in the bookmark DB 60 in step S150.

Figure 4:
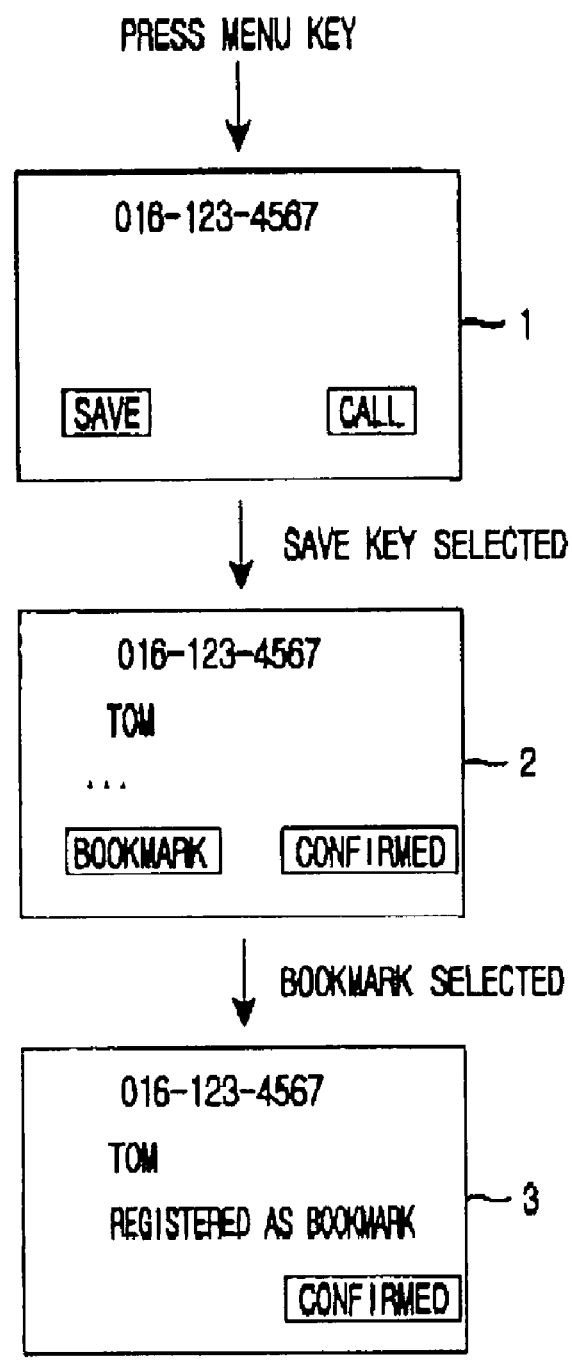
FIG. 4 illustrates displays sequentially showing the operation of registering a phone number as a bookmark according to the embodiment of the present invention.

FIG. 4 illustrates displays showing the procedure of registering a phone number as a bookmark according to the embodiment of the present invention. Referring to FIG. 4, when a phone number is received, display 1 prompts the user to select Save or Call. If Call is selected, the controller 20 automatically dials the phone number. On the other hand, if Save is selected, the controller 20 stores the phone number together with additionally received related information in the phone number DB 50 and display 2 prompts the user to select Bookmark or Confirmed. If Confirmed is selected, the phone number storing procedure ends. If Bookmark is selected, the controller 20 stores the phone number together with the related information in the bookmark DB 60 and display 3 indicates that the entered phone number has been registered as a bookmark.

While the above description details manual registration of a phone number as a bookmark, automatic registration of a phone number as a bookmark can be contemplated as a second embodiment of the present invention. In the second embodiment of the present invention, every time a call is requested, the controller 20 counts the number of calls to each phone number. If the number of calls to a phone number exceeds a first threshold (e.g., 10), the phone number is automatically registered as a bookmark in the bookmark DB 60. The automatic bookmark registration is carried out when the user sets an automatic bookmark registration mode. Even in the automatic bookmark registration mode, the manual bookmark registration can be performed upon user request.

The controller 20 automatically counts, when pre-set by the user, or manually counts, when selected by the user at each call, the number of calls to each phone number stored in the bookmark DB 60. If the number of calls to a phone number for a predetermined period (e.g., one week) does not exceed a predetermined second threshold (e.g., 2), the phone number is automatically detected from the bookmark DB 60. The automatic phone number deletion is carried out in an automatic bookmark deletion mode and a manual bookmark deletion can also be carried out upon user request.

Phone numbers automatically or manually registered in the bookmark DB 60 are provided upon user request. For this purpose, the terminal presents a menu item that provides only bookmarked phone numbers.

Figure 5:
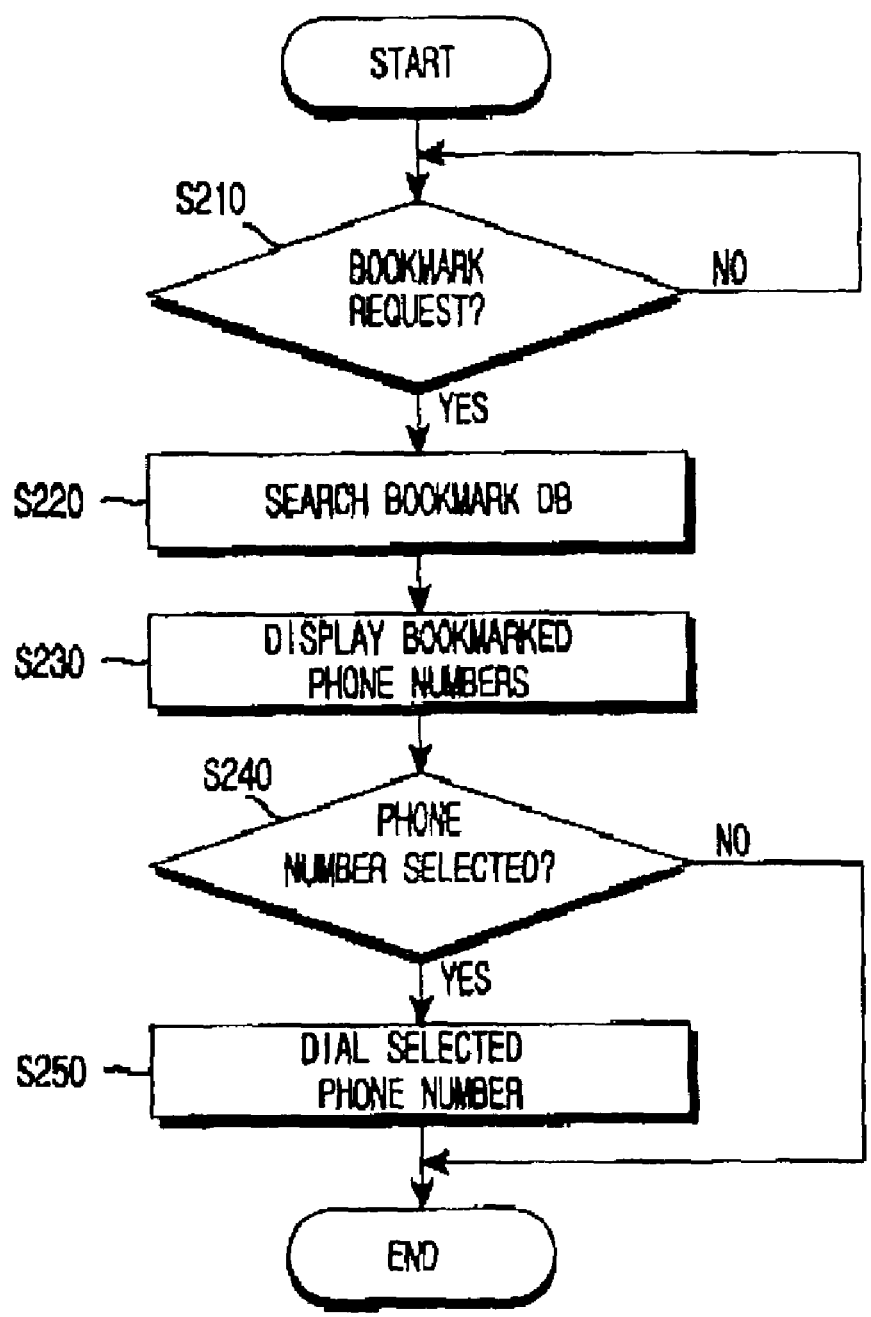
FIG. 5 is a flowchart illustrating an operation of searching a bookmark DB for a phone number according to the embodiment of the present invention.

FIG. 5 is a flowchart illustrating a procedure of searching the bookmark DB 60 for a phone number according to the embodiment of the present invention. Referring to FIG. 5, when the user requests bookmarked phone numbers through the keypad 40 in steps S210, the controller 20 searches the bookmark DB 60 for the bookmarked phone numbers in step S220 and displays them on the display 30 in step S230. If the user selects one of the bookmarked phone numbers displayed on the display 30 in step S240, the controller 20 displays the selected bookmarked phone number on the display 30 and dials the phone number automatically when the user has requested dialing to the phone number in step S250.

Figure 6:
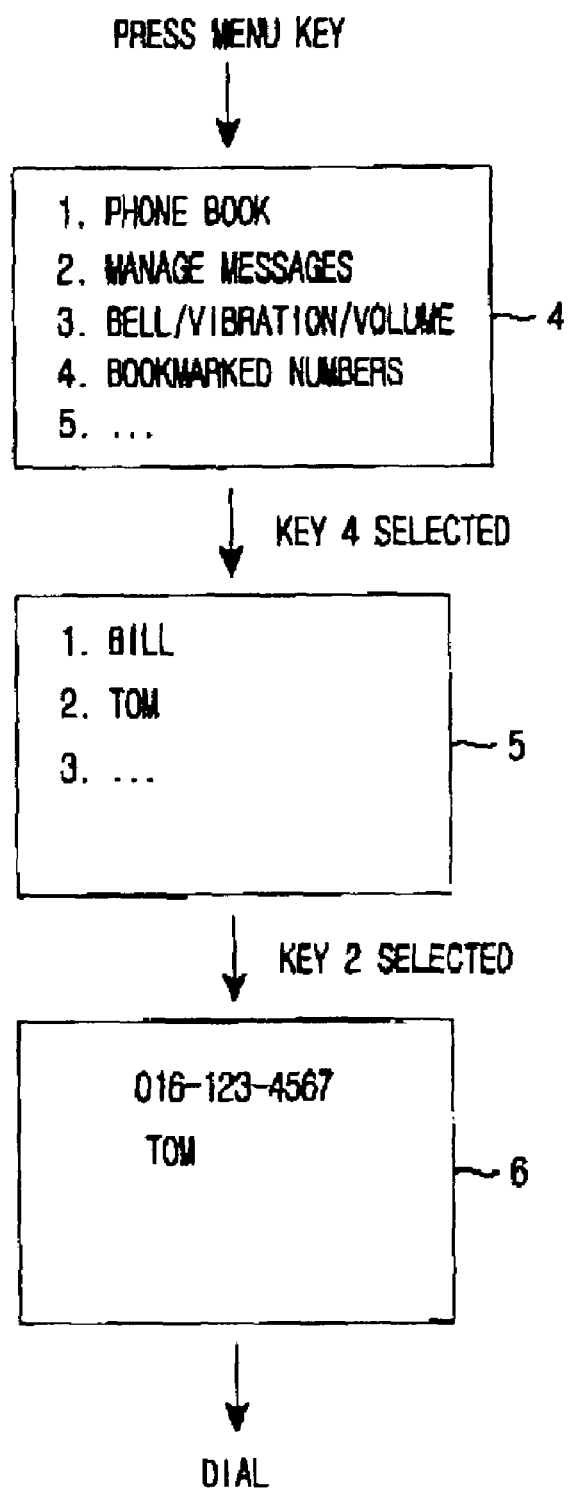
FIG. 6 illustrates displays sequentially showing the operation of searching the bookmark DB for a phone number according to the embodiment of the present invention.

FIG. 6 illustrates displays showing the operation of searching for a bookmarked phone number according to the present invention. As shown in FIG. 6, when the user presses a Menu key, display 4 provides menu items "1. phone book, . . . , 4. bookmarked number". If menu item 4 is selected, display 5 provides bookmarked phone numbers (or names) referring to the bookmark phone book stored in the bookmark DB 60. Upon selection of one of the bookmarked phone numbers (or names), for example, item 2, display 6 shows the selected bookmarked phone number (or name). Then, the phone number (or name) is dialed automatically when the user requests dialing to the phone number (or name).

Therefore, the user can call without the need of memorizing frequently used phone numbers or direct dialing. To efficiently manage the bookmark phone book, the number of entries of phone numbers in the bookmark DB 60 can be limited to, for example, 10. This is because if too many phone numbers are bookmarked, it takes a lot of time for the user to search for an intended bookmarked phone number.

While bookmarked phone numbers are stored only in the bookmark DB in the above description, the present invention can also be implemented by adding bookmark fields to phone number records in the phone number DB. In this case, the entire phone book is searched for bookmarked phone numbers upon user request.

In accordance with the present invention as described above, frequently used phone numbers are automatically or manually stored in a database, so that the user can dial the frequently used phone numbers more conveniently by use of a bookmark menu.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bookmarking method in a terminal having a phone number database (DB) for storing phone numbers in an electronic phone book and a bookmark DB, comprising the steps of:
    counting the number of calls to each phone number;
    storing a phone number in the phone number DB in response to a phone number registration request for the phone number; and
    automatically storing a phone number in the bookmark DB if the number of calls to the phone number exceeds a predetermined first threshold; and
    deleting the phone number from the bookmark DB if the number of calls to the phone number for a predetermined time period does not exceed a predetermined second threshold.

2. The bookmarking method of claim 1, further comprising the steps of: counting numbers of calls to each phone number stored in the bookmark DB.

3. The bookmarking method of claim 1, wherein the bookmark DB and the phone number DB are stored in different memories.

4. The bookmarking method of claim 1, wherein the bookmark DB and the phone number DB are stored in different storing areas of the same memory.

5. A bookmarking method in a terminal having a phone number DB for storing phone numbers in an electronic phone book and a bookmark DB, comprising the steps of:
    receiving a phone number in the terminal;
    storing the received phone number in the phone number DB in response to a phone number registration request for the phone number;
    storing the received phone number in the bookmark DB in response to a bookmark registration request for the phone number, wherein the bookmark registration request is selected from a request by a user and an automatic request issued when the number of calls to the phone number exceeds a predetermined first threshold; and
    deleting the received phone number from the bookmark DB if the number of calls to the received phone number for a predetermined time period does not exceed a predetermined second threshold.

6. The bookmarking method of claim 5, wherein the bookmark DB and the phone number DB are stored in different memories.

7. The bookmarking method of claim 5, wherein the bookmark DB and the phone number DB are stored in different storing areas of the same memory.

8. A bookmarking method in a terminal having a phone number DB for storing phone numbers in an electronic phone book and a bookmark DB, comprising the steps of:
    storing a phone number in the phone number DB in response to a phone number registration request for the phone number;
    displaying bookmarked phone numbers stored in the bookmark DB upon a user request for a bookmark mode operation, wherein the bookmarked phone numbers are stored in response to a request selected from a request by a user and an automatic request issued when the number of calls to a phone number exceeds a predetermined first threshold;
    automatically dialing a phone number if the phone number is selected among the displayed bookmarked phone numbers; and
    deleting the phone number from the bookmark DB if the number of calls to the phone number for a predetermined time period does not exceed a predetermined second threshold.

9. A terminal using an electronic phone book, comprising:
    a phone number DB for storing at least one phone number entered by a user in response to a phone number registration request for the phone number;
    a bookmark DB for storing at least one manually user-registered phone number and/or at least one automatically registered phone number, wherein the automatically registered phone number is stored if the number of calls to that phone number exceeds a predetermined first threshold; and
    a controller for searching the phone number DB for the at least one phone number or searching the bookmark DB for the at least one bookmarked phone number in response to a user request, wherein if the number of calls to the at least one phone number registered in the bookmark DB for a predetermined time period does not exceed a predetermined second threshold, the phone number is deleted from the bookmark DB.

* * * * *